US008396225B2

(12) United States Patent
Christoph et al.

(10) Patent No.: US 8,396,225 B2
(45) Date of Patent: Mar. 12, 2013

(54) ACTIVE NOISE CONTROL USING BASS MANAGEMENT AND A METHOD FOR AN AUTOMATIC EQUALIZATION OF SOUND PRESSURE LEVELS

(75) Inventors: Markus Christoph, Staubing (DE); Leander Scholz, Salching (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 1088 days.

(21) Appl. No.: 12/240,464

(22) Filed: Sep. 29, 2008

(65) Prior Publication Data

US 2009/0086995 A1 Apr. 2, 2009

(30) Foreign Application Priority Data

Sep. 27, 2007 (EP) .................................... 07019092

(51) Int. Cl.
*H04R 29/00* (2006.01)
*H04B 1/00* (2006.01)

(52) U.S. Cl. ............................................ 381/56; 381/86

(58) Field of Classification Search .................... 381/59, 381/86, 103, 307
See application file for complete search history.

(56) References Cited

U.S. PATENT DOCUMENTS

| | | | | |
|---|---|---|---|---|
| 7,386,139 | B2 * | 6/2008 | Hashimoto et al. | 381/310 |
| 2001/0016047 | A1 | 8/2001 | Ohta | |
| 2005/0031143 | A1 | 2/2005 | Devantier et al. | |
| 2005/0152562 | A1 | 7/2005 | Holmi et al. | |
| 2007/0025559 | A1 | 2/2007 | Mihelich et al. | |
| 2008/0049948 | A1 * | 2/2008 | Christoph et al. | 381/86 |
| 2009/0220098 | A1 * | 9/2009 | Christoph, Markus | 381/59 |

FOREIGN PATENT DOCUMENTS

| | | |
|---|---|---|
| EP | 1843635 | 10/2007 |
| WO | WO 2007016527 | 2/2007 |

* cited by examiner

*Primary Examiner* — Calvin Lee
(74) *Attorney, Agent, or Firm* — O'Shea Getz P.C.

(57) ABSTRACT

A method for an automatic equalization of sound pressure levels in at least one listening location, where the sound pressure is generated by a first and at least a second loudspeaker, comprising supplying an audio signal of a programmable frequency to each loudspeaker, where the audio signal supplied to the second loudspeaker is phase-shifted by a programmable phase shift relative to the audio signal supplied to the first loudspeaker, and where the phase shifts of the audio signals supplied to the other loudspeakers thereby are initially zero or constant; measuring the sound pressure level at each listening location for different phase shifts and for different frequencies; providing a cost function dependent on the sound pressure level; and searching a frequency dependent optimal phase shift that yields an extremum of the cost function, thus obtaining a phase function representing the optimal phase shift as a function of frequency.

28 Claims, 11 Drawing Sheets

ACTIVE NOISE CONTROL USING BASS MANAGEMENT AND A METHOD FOR AN AUTOMATIC EQUALIZATION OF SOUND PRESSURE LEVELS

CROSS REFERENCE TO RELATED APPLICATIONS

This application contains subject matter related to commonly assigned application Ser. No. 12/240,523, entitled "Active Noise Control Using Bass Management". This application is hereby incorporated by reference.

CLAIM OF PRIORITY

This patent application claims priority to European Patent Application serial number 07 019 092.1 filed on Sep. 27, 2007.

1. Field of the Invention

The present invention relates to automatically equalizing the sound pressure level in the low frequency (bass) range generated by a sound system.

2. Related Art

The process of acoustically optimizing dedicated systems (e.g., in motor vehicles) has been performed by hand. Although there have been major efforts to automate this manual process, these techniques have shown weaknesses in practice or are extremely complex and costly. In small, highly reflective areas, such as the interior of a car, poor improvements in the acoustics are achieved. In some cases, the results are even worse.

Especially in the frequency range below approximately 100 Hertz, standing waves in the interior of small highly reflective room can cause strongly different sound pressure levels (SPL) in different listening locations that are, for example, the two front passenger seats and the two rear passenger seats in a motor vehicle. These different sound pressure levels entail the audio perception of a person being dependent on his/her listening location. However, the fact that it is possible to achieve a good acoustic result even with simple techniques has been proven by the work of professional acousticians.

A technique is known which allows acoustics to be modeled in virtually any area. However, this so-called wave-field synthesis requires extensive resources such as computation power, memories, loudspeakers, amplifier channels, etc. This technique is thus not suitable for many applications due to cost and feasibility, especially in the automotive industry.

Therefore, there is a need for an automatic bass management technique that adequately replaces the complex process of manual equalizing by experienced acousticians and reliably provides frequency responses in the bass frequency range at predetermined listening locations which match the profile of predetermined target functions.

SUMMARY OF THE INVENTION

A method for automated equalization of sound pressure levels in at least one listening location, where the sound pressure is generated by a first and at least a second loudspeaker, includes supplying an audio signal of a programmable frequency to each loudspeaker, where the audio signal supplied to the second loudspeaker is phase-shifted by a programmable phase shift relative to the audio signal supplied to the first loudspeaker. The phase shifts of the audio signals supplied to the other loudspeakers thereby are initially zero or constant. The sound pressure level is measured at each listening location for different phase shifts and for different frequencies, and a cost function is provided dependent on the sound pressure level. The automated equalization technique searches for a frequency dependent optimal phase shift that yields an extremum of the cost function, thus obtaining a phase function representing the optimal phase shift as a function of frequency.

The second loudspeaker may be operated with a filter connected upstream thereof, where the filter at least approximately establishes the phase function, thus applying a respective frequency dependent optimal phase shift to the audio signal fed to the second loudspeaker. If the sound system to be equalized comprises more than two loudspeakers, the above steps may be repeated for each additional loudspeaker.

Alternatively, measuring of the sound pressure level may be replaced by calculating the sound pressure level. Such a method for an automatic equalization of sound pressure levels in at least one listening location, where the sound pressure is generated by a first and at least a second loudspeaker, comprises determining the transfer characteristic of each combination of loudspeaker and listening location calculating a sound pressure level at each listening location assuming for the calculation that an audio signal of a programmable frequency is supplied to each loudspeaker, where the audio signal supplied to the second loudspeaker is phase-shifted by a programmable phase shift relative to the audio signal supplied to the first loudspeaker, and where the phase shifts of the audio signals supplied to the other loudspeakers are initially zero or constant, providing a cost function dependent on the sound pressure level, and searching a frequency dependent optimal phase shift that yields an extremum of the cost function, thus obtaining a phase function representing the optimal phase shift as a function of frequency.

In another example of the invention, in the above methods sound pressure level measurements are performed in at least two listening locations or calculations are performed for at least two listening locations.

The cost function may be dependent on the calculated or measured sound pressure levels and a predefined target function. In this case the actual sound pressure levels are equalized to the target function.

DESCRIPTION OF THE DRAWINGS

The invention can be better understood with reference to the following drawings and description. The components in the figures are not necessarily to scale, instead emphasis is placed upon illustrating the principles of the invention. Moreover, in the figures, like reference numerals designate corresponding parts. In the drawings.

DETAILED DESCRIPTION

Figure 1:
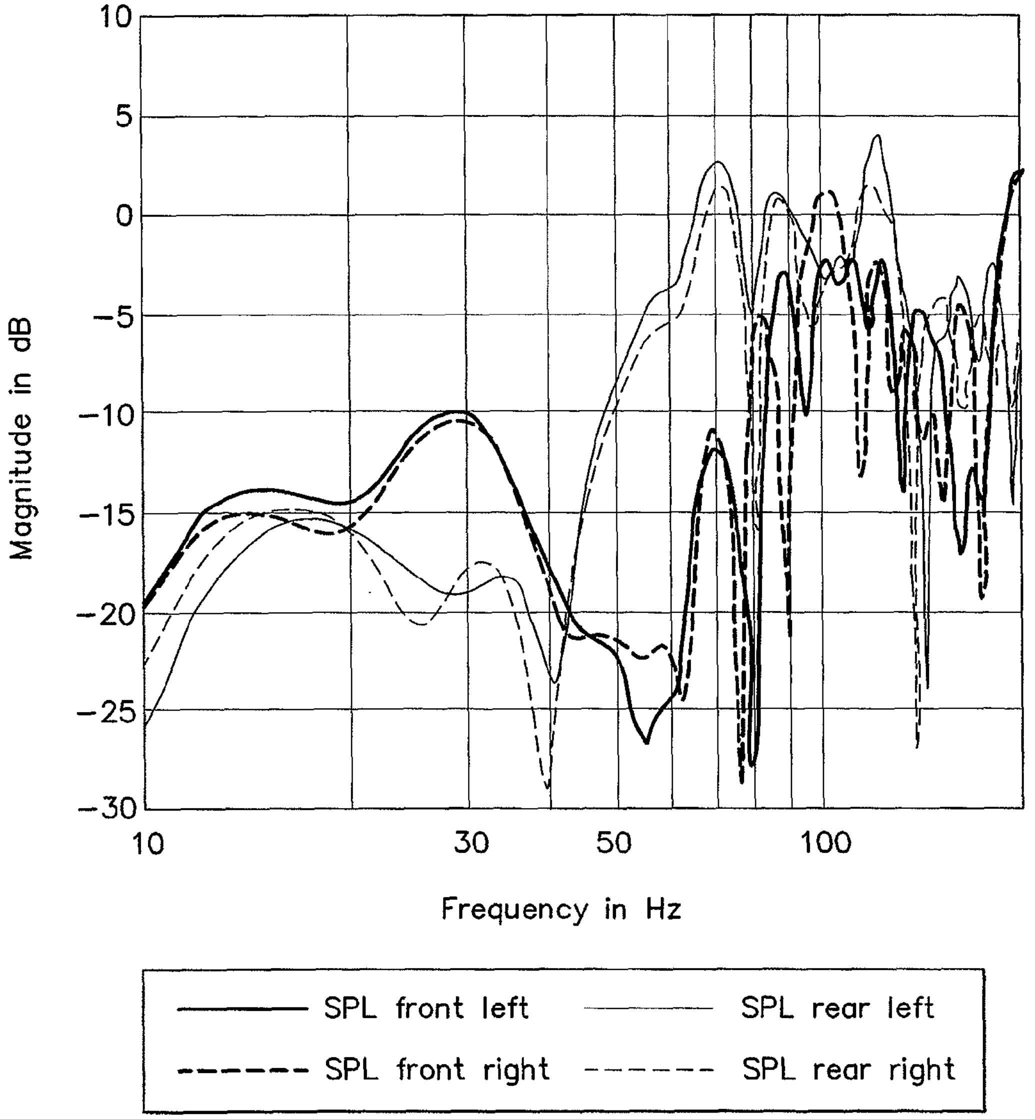
FIG. 1 illustrates the sound pressure level in decibel over frequency measured on four different listening locations within a passenger compartment of a car with an unmodified audio signal being supplied to the loudspeakers.

While reproducing an audio signal by a loudspeaker or a set of loudspeakers in a car, measurements in the passenger compartment of the car yield considerably different results for the sound pressure level (SPL) observed at different listening locations even where the loudspeakers are symmetrically arranged within the car. The diagram of FIG. 1 illustrates this effect. In the diagram four curves are depicted, each illustrating the sound pressure level in decibel (dB) over frequency which have been measured at four different listening locations in the passenger compartment, namely near the head restraints of the two front and the two rear passenger seats, while supplying an audio signal to the loudspeakers. The sound pressure level measured at listening locations in the front of the room and the sound pressure level measured at listening locations in the rear differ by up to 15 dB dependent on the considered frequency. However, the biggest gap between the SPL curves can be typically observed within a frequency range from approximately 40 to 90 Hertz which is part of the bass frequency range.

"Bass frequency range" is not a well-defined term but is widely used in acoustics for low frequencies in the range from, for example, 0 to 80 Hertz, 0 to 120 Hertz or even 0 to 150 Hertz. When using car sound systems with a subwoofer placed in the rear window shelf or in the rear trunk, an undesirable distribution of sound pressure level within the listening room may be observed. The SPL maximum between 60 and 70 Hertz (see FIG. 1) may be regarded as booming and unpleasant by rear passengers.

Figure 2:
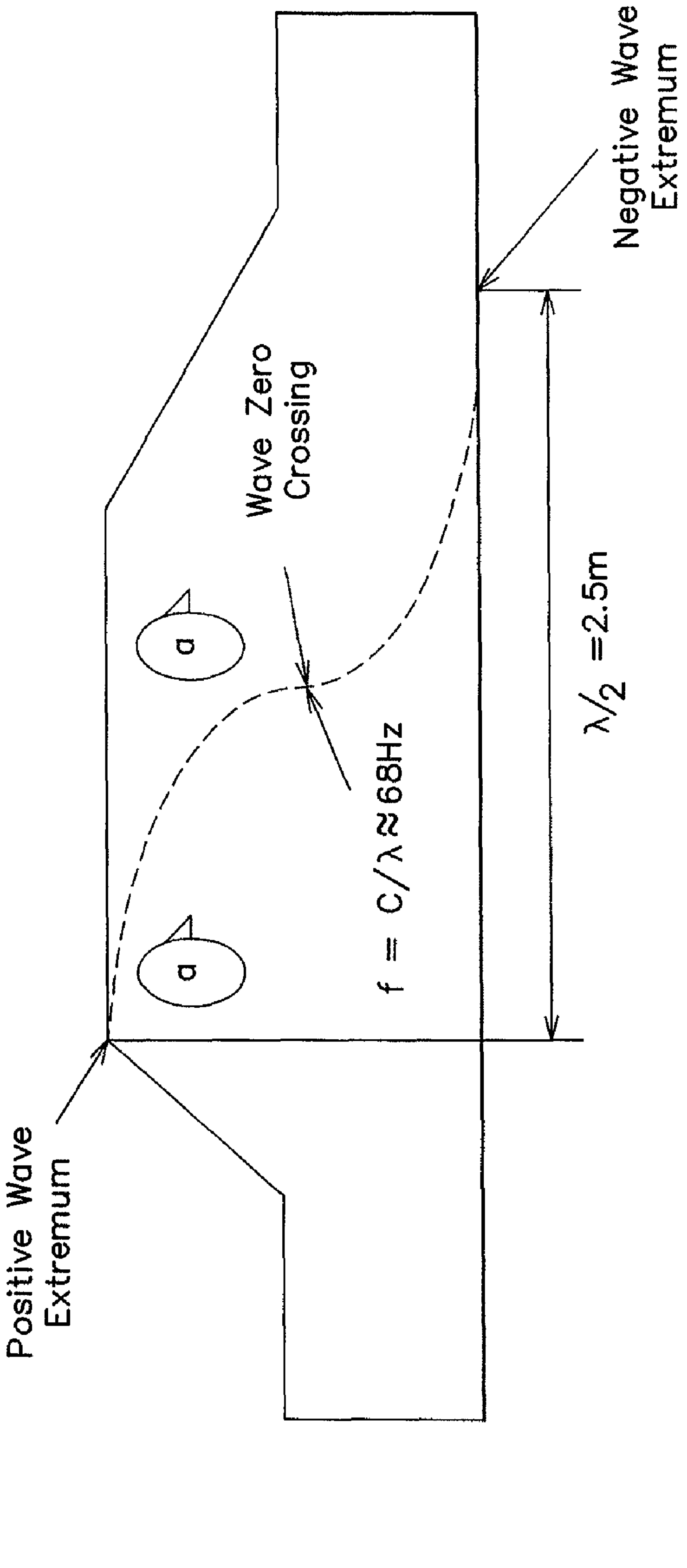
FIG. 2 illustrates standing acoustic waves within the passenger compartment of a car which are responsible for large differences in sound pressure level (SPL) between the listening locations.

The frequency range, wherein a big discrepancy between the sound pressure levels in different listening locations, especially between locations in the front and in the rear of the car, can be observed, depends on the dimensions of the listening room. The reason for this will be explained with reference to FIG. 2 which is a schematic side-view of a car. A half wavelength (denoted as $\lambda/2$) fits lengthwise in the passenger compartment. A typical length of $\lambda/2=2.5$ m yields a frequency of $f=c/\lambda=68$ Hz when assuming a speed of sound of $c=340$ m/s. FIG. 1 illustrates that at approximately $f=c/\lambda=68$ Hz a maximum SPL can be observed at the rear listening locations. Therefore it can be concluded that superpositions of several standing waves in longitudinal and in lateral direction in the interior of the car (the listening room) are responsible for the inhomogeneous SPL distribution in the listening room.

In order to achieve more similar, or in the best case equal, SPL curves (magnitude over frequency) at a given set of listening locations within the listening room, a technique for an automatic equalization of the sound pressure level is described below by way of examples. For the following discussion it is assumed that only two loudspeakers are arranged in a listening room (e.g., a passenger compartment of a car) wherein four different listening locations are of interest, namely a front left (FL), a front right (FR) a rear left (RL) and a rear right (RR) positions. Of course the number of loudspeakers and listening positions is not limited. The technique may be generalized to an arbitrary number of loudspeakers and listening locations.

Both loudspeakers are supplied with the same audio signal of a defined frequency f, such that both loudspeakers contribute to the generation of the respective sound pressure level in each listening location. The audio signal is provided by a signal source (e.g., an amplifier) having an output channel for each loudspeaker to be connected. At least the output channel supplying the second one of the loudspeakers is configured to apply a programmable phase shift $\phi$ to the audio signal supplied to the second loudspeaker.

Figure 3:
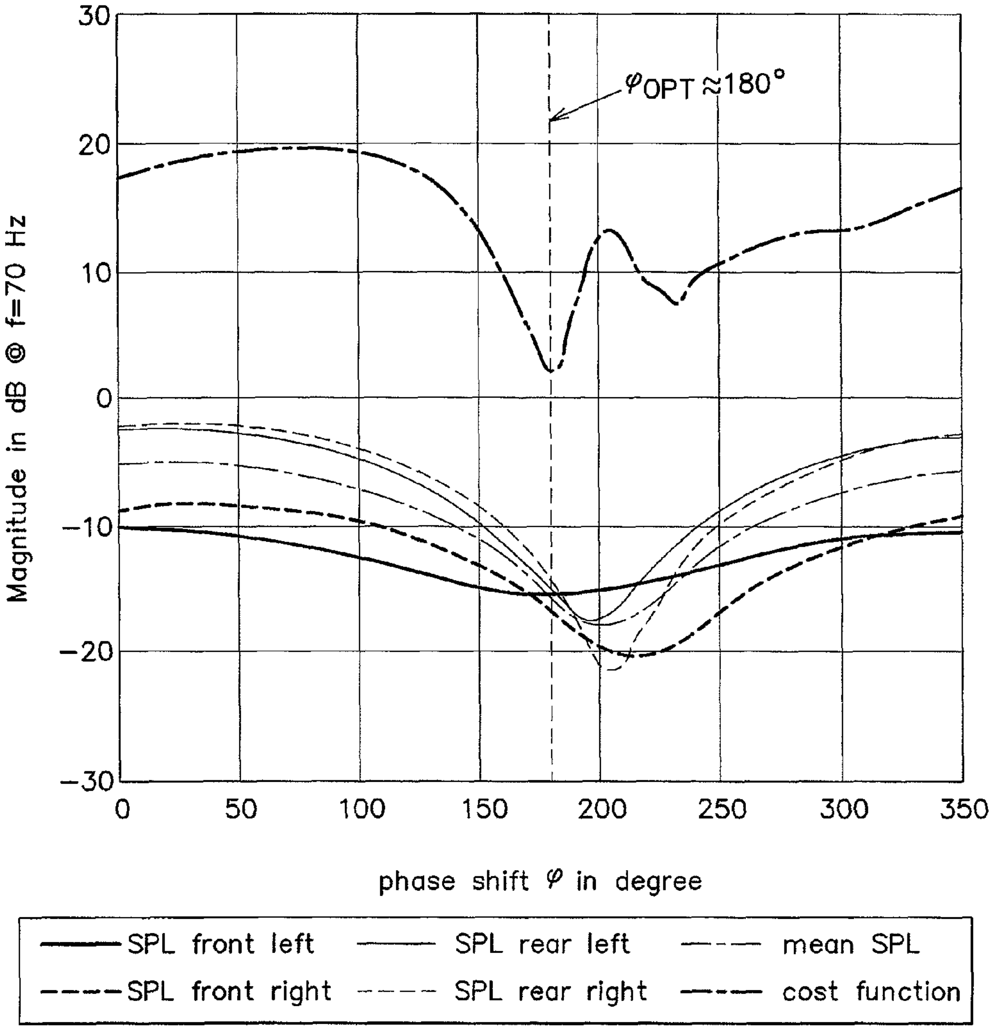
FIG. 3 illustrates the sound pressure level in decibel over phase shift which the audio signal supplied to one of the loudspeakers is subjected to; a minimum distance between the sound pressure levels at the listening locations and a reference sound pressure level is found at the minimum cost function representing the distance.

The sound pressure level observed at the listening locations of interest will change dependent on the phase shift applied to the audio signal that is fed to the second loudspeaker while the first loudspeaker receives the same audio signal with no phase shift applied to it. The dependency of sound pressure level SPL in decibels (dB) on phase shift $\phi$ in degrees (°) at a given frequency (in this example 70 Hz) is illustrated in FIG. 3 as well as the mean level of the four sound pressure levels measured at the four different listening locations.

A cost function $CF(\phi)$ is provided which represents the "distance" between the four sound pressure levels and a reference sound pressure level $SPL_{REF}(\phi)$ at a given frequency. The cost function may be defined as:

$$CF(\phi)=|SPL_{FL}(\phi)-SPL_{REF}(\phi)|+|SPL_{FR}(\phi)-SPL_{REF}(\phi)|+|SPL_{RL}(\phi)-SPL_{REF}(\phi)|+|SPL_{RR}(\phi)-SPL_{REF}(\phi)|, \quad \text{(EQ. 1)}$$

where the symbols $SPL_{FL}$, $SPL_{FR}$, $SPL_{RL}$, $SPL_{RR}$ denote the sound pressure levels at the front left, the front right, the rear left and the rear right positions respectively. The symbol $\phi$ in parentheses indicate that each sound pressure level is a function of the phase shift $\phi$. The distance between the actually measured sound pressure level and the reference sound pressure level is a measure of quality of equalization, i.e., the lower the distance, the better the actual sound pressure level approximates the reference sound pressure level. In the case that only one listening location is considered, the distance may be calculated as the absolute difference between the measured sound pressure level and the reference sound pressure level, which may theoretically become zero.

EQ. 1 is an example for a cost function whose function value becomes smaller as the sound pressure levels $SPL_{FL}$, $SPL_{FR}$, $SPL_{RL}$, $SPL_{RR}$ approach the reference sound pressure level $SPL_{REF}$. The phase shift $\phi$ that minimizes the cost function yields an "optimum" distribution of the sound pressure level, i.e., the sound pressure level measured at the four listening locations that have approached the reference sound pressure level as good as possible and thus the sound pressure levels at the four different listening locations are equalized resulting in an improved room acoustics. In the example of FIG. 3, the mean sound pressure level is used as reference $SPL_{REF}$ and the optimum phase shift that minimizes the cost function $CF(\phi)$ has been determined to be approximately 180° (indicated by the vertical line).

The cost function may be weighted with a frequency dependent factor that is inversely proportional to the mean sound pressure level. Accordingly, the value of the cost function is weighted less at high sound pressure levels. As a result an additional maximation of the sound pressure level can be achieved. Generally the cost function may depend on the sound pressure level, and/or the above-mentioned distance and/or a maximum sound pressure level.

In the above example, the optimal phase shift has been determined to be approximately 180° at a frequency of the audio signal of 70 Hz. Of course the optimal phase shift is different at different frequencies. Defining a reference sound pressure level $SPL_{REF}(\phi, f)$ for every frequency of interest allows for defining cost function $CF(\phi, f)$ being dependent on phase shift and frequency of the audio signal. An example of a cost function $CF(\phi, f)$ being a function of phase shift and frequency is illustrated as a 3D-plot in FIG. 4. The mean of the sound pressure level measured in the considered listening locations is thereby used as reference sound pressure level. However, the sound pressure level measured at a certain listening location or any mean value of sound pressure levels measured in at least two listening locations may be used. Alternatively, a predefined target function of desired sound pressure levels may be used as reference sound pressure levels. Combinations of the above examples may be useful.

For each frequency f of interest, an optimum phase shift can be determined by searching the minimum of the respective cost function as explained above, thus obtaining a phase function of optimal phase shifts $\phi_{OPT}(f)$ as a function of frequency. An example of such a phase function $\phi_{OPT}(f)$ (derived from the cost function $CF(\phi, f)$ of FIG. 4) is depicted in FIG. 5.

The technique for obtaining a phase function $\phi_{OPT}(f)$ for optimal phase shifts in a sound system having a first and a second loudspeaker can be summarized as follows:

- Supply an audio signal of a programmable frequency f to each loudspeaker. As explained above, the second loudspeaker has a delay element connected upstream thereto configured to apply a programmable phase-shift $\phi$ to the respective audio signal.
- Measure the sound pressure level $SPL_{FL}(\phi, f)$, $SPL_{FR}(\phi, f)$, $SPL_{RL}(\phi, f)$, $SPL_{RR}(\phi, f)$ at each listening location for different phase shifts $\phi$ within a certain phase range (e.g. 0° to 360°) and for different frequencies within a certain frequency range (e.g. 0 Hz to 150 Hz).
- Calculate the value of a cost function $CF(\phi, f)$ for each pair of phase shift $\phi$ and frequency f, wherein the cost function $CF(\phi, f)$ is dependent on the sound pressure level $SPL_{FL}(\phi, f)$, $SPL_{FR}(\phi, f)$, $SPL_{RL}(\phi, f)$, $SPL_{RR}(\phi, f)$.
- Search, for every frequency value f for which the cost function has been calculated, the optimal phase shift $\phi_{OPT}(f)$ which minimizes the cost function $CF(\phi, f)$, that is $$CF(\phi_{OPT}, f) = \min\{CF(\phi, f)\} \text{ for } \phi \in [0°, 360°], \quad \text{(EQ. 2)}$$

thus obtaining a phase function $\phi_{OPT}(f)$ representing the optimal phase shift $\phi_{OPT}(f)$ as a function of frequency.

In one example, the cost function is calculated for discrete frequencies $f = f_k \in \{f_0, f_1, \ldots, f_{K-1}\}$ and for discrete phase shifts $\phi = \phi_n \in \{\phi_0, \phi_1, \ldots, \phi_{N-1}\}$, wherein the frequencies may be a sequence of discrete frequencies with a fixed step-width $\Delta f$ (e.g., $\Delta f = 1$ Hz) as well as the phase shifts may be a sequence of discrete phase shifts with a fixed step-width $\Delta\phi$ (e.g., $\Delta\phi = 1°$). In this example, the calculated values of the cost function $CF(\phi, f)$ may be arranged in a matrix $CF[n, k]$ with lines and columns, wherein a line index k represents the frequency $f_k$ and the column index n represents the phase shift $\phi_n$. The phase function $\phi_{OPT}(f_k)$ may then be found by searching the minimum value for each line of the matrix. In mathematical terms:

$$\phi_{OPT}(f_k) = \phi_i \text{ for } CF[i, k] = \min\{CF[n, k]\}, \quad \text{(EQ. 3)}$$

$n \in \{0, \ldots N-1\}$, $k \in \{0, \ldots K-1\}$.

For an optimum performance of the bass reproduction of the sound system, the optimal phase shift $\phi_{OPT}(f)$, which is to be applied to the audio signal supplied to the second loudspeaker, is different for every frequency value f. A frequency dependent phase shift can be implemented by an all-pass filter whose phase response has to be designed to match the phase function $\phi_{OPT}(f)$ of optimal phase shifts as good as possible. An all-pass filter with a phase response equal to the phase function $\phi_{OPT}(f)$ that is obtained as explained above would equalize the bass reproduction in an optimum manner. A FIR all-pass filter may be appropriate for this purpose although some trade-offs have to be accepted. In the following examples a 4096 tap FIR-filter is used for implementing the phase function $\phi_{OPT}(f)$. However, Infinite Impulse Response (IIR) filters, or all-pass filter chains, may also be used instead, as well as analog filters, which may be implemented as operational amplifier circuits.

Looking at FIG. 5, one can see that the phase function $\phi_{OPT}(f)$ comprises many discontinuities resulting in very steep slopes $d\phi_{OPT}/df$. Such steep slopes $d\phi_{OPT}/df$ may only be implemented by FIR filters with a sufficient precision when using extremely high filter orders which is problematic in practice. Therefore, the slope of the phase function $\phi_{OPT}(f)$ is limited, for example, to ±10°. This means, that the minimum search (e.g., EQ. 3) is performed with the constraint (side condition) that the phase must not differ by more than 10° per Hz from the optimum phase determined for the previous frequency value. In mathematical terms, the minimum search is performed according EQ. 3 with the constraint $$|\phi_{OPT}(f_k) - \phi_{OPT}(f_{k-1})| / |f_k - f_{k-1}| < 10°. \quad \text{(EQ. 4)}$$

In other words, in the present example the function "min" (e.g., EQ. 3) does not just mean "find the minimum" but "find the minimum for which EQ. 4 is valid". In practice the search interval wherein the minimum search is performed is restricted.

Figure 6:
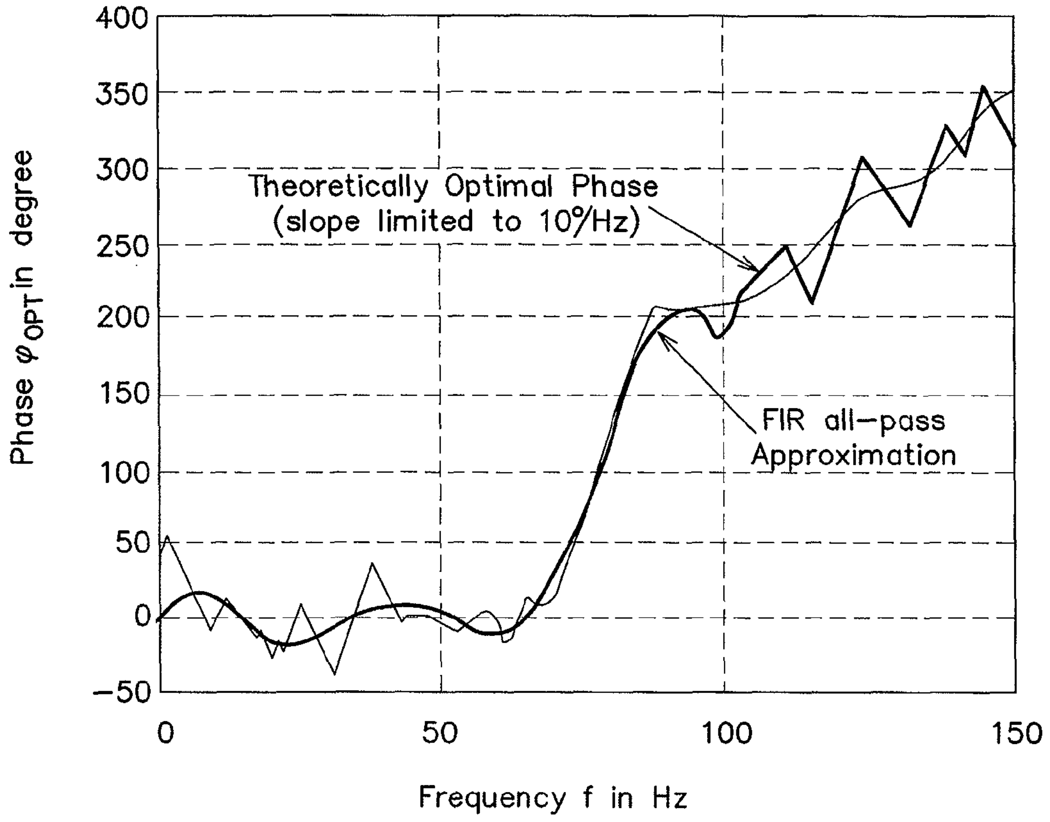
FIG. 6 illustrates the approximation of the phase function by the phase response of a 4096 tap FIR all-pass filter.
Figure 7A:
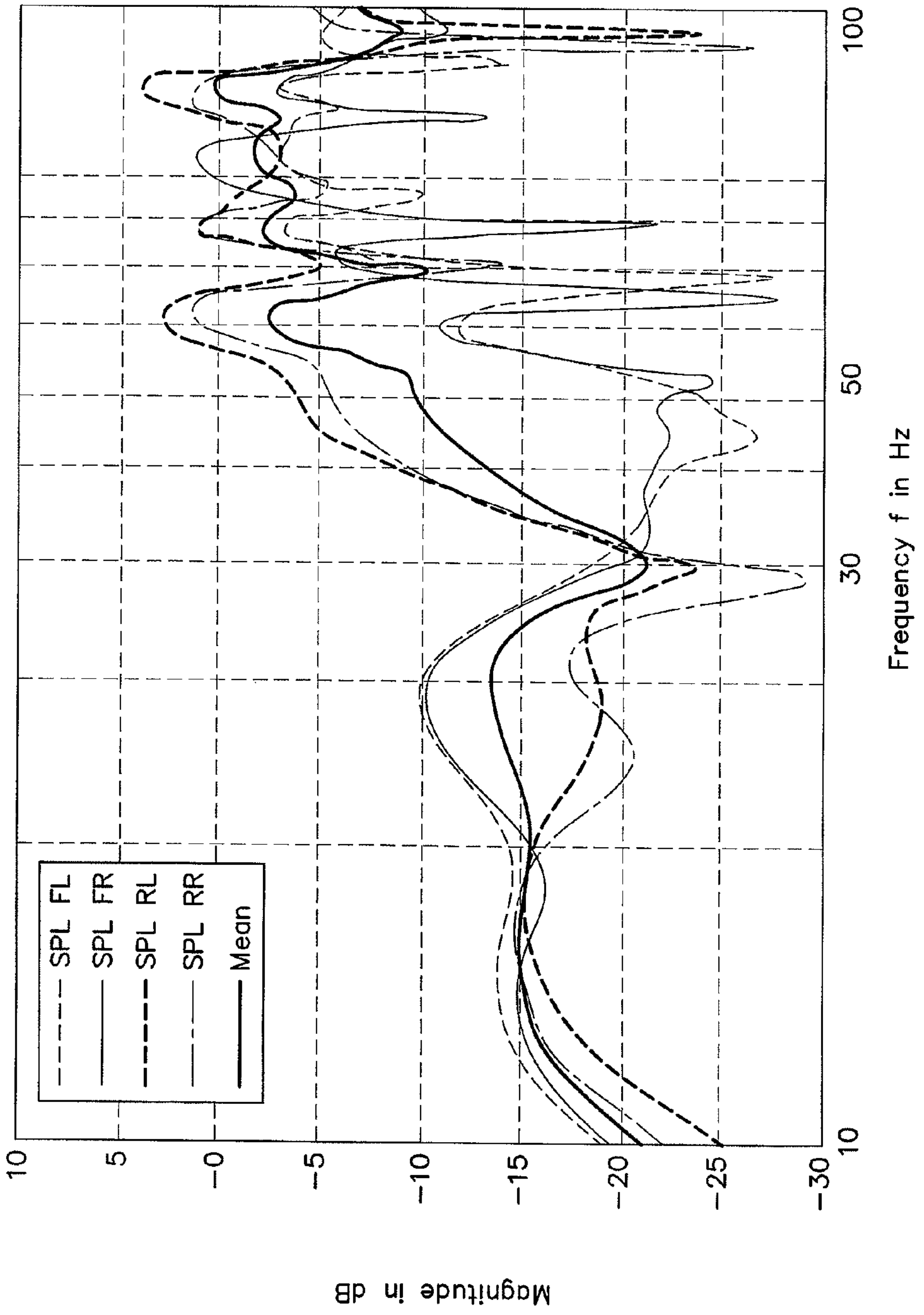
FIG. 7 illustrates the performance of the FIR all-pass filter in FIG. 6 and the effect on the sound pressure levels at the different listening locations.

FIG. 6 is a diagram illustrating a phase function $\phi_{OPT}(f)$ obtained according to EQ. 3 and EQ. 4 where the slope of the phase has been limited to 10°/Hz. The phase response of a 4096 tap FIR filter which approximates the phase function $\phi_{OPT}(f)$ is also depicted in FIG. 6. The approximation of the phase is regarded as sufficient in practice. The performance of the FIR all-pass filter compared to the "ideal" phase shift $\phi_{OPT}(f)$ is illustrated in FIGS. 7A and 7D.

The examples described above comprise SPL measurements in at least two listening locations. However, for some applications it may be sufficient to determine the SPL curves for only one listening location. In this example, a homogenous SPL distribution cannot be achieved, but with an appropriate cost function an optimization in view of another criterion may be achieved. For example, the achievable SPL output may be maximized and/or the frequency response, i.e., the SPL curve over frequency, may be "designed" to approximately fit a given desired frequency response. Thereby the tonality of the listening room can be adjusted or "equalized" which is a common term used therefore in acoustics.

As described above, the sound pressure levels at each listening location may be actually measured at different frequencies and for various phase shifts. Alternatively, these measurements may be (fully or partially) replaced by a model calculation to determine the sought SPL curves by simulation. For example, in calculating sound pressure level at a defined listening location, knowledge about the transfer characteristic from each loudspeaker to the respective listening location is required.

Consequently, before starting calculations, the transfer characteristic of each combination of loudspeaker and listening location has to be determined. This may be done by estimating the impulse responses (or the transfer functions in the frequency domain) of each transmission path from each loudspeaker to the considered listening location. For example, the impulse responses may be estimated from sound pressure level measurements when supplying a broad band signal sequentially to each loudspeaker. Alternatively, adaptive filters may be used. Furthermore, other known techniques for parametric and nonparametric model estimation may be employed.

Figure 4:
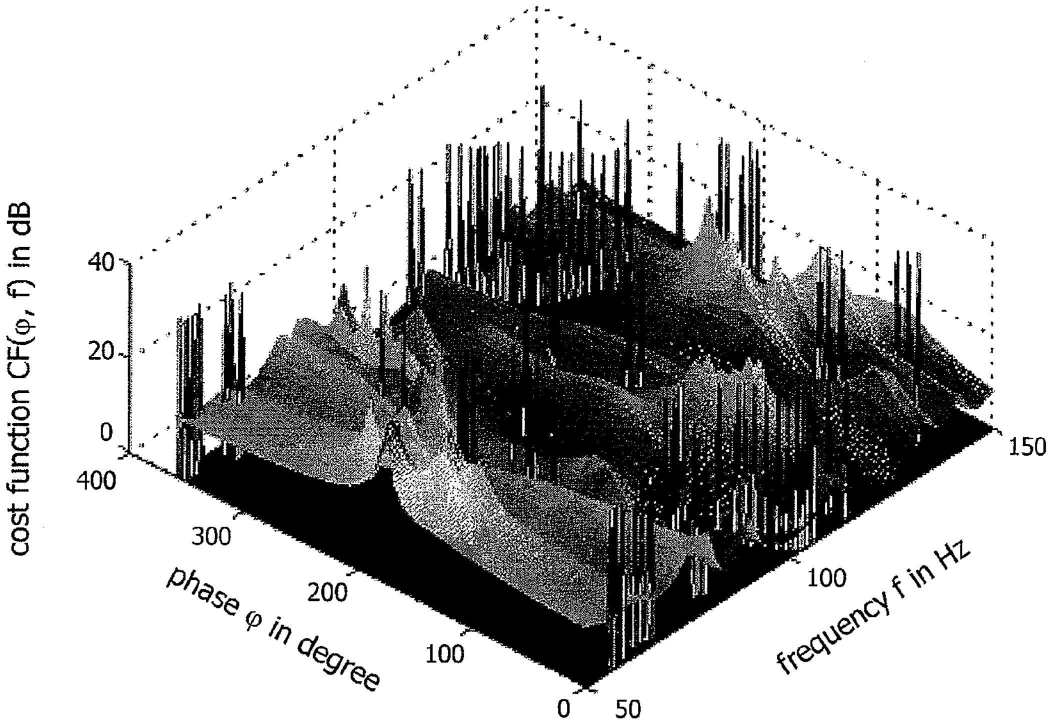
FIG. 4 is a 3D-view of the cost function over phase at different frequencies.
Figure 5:
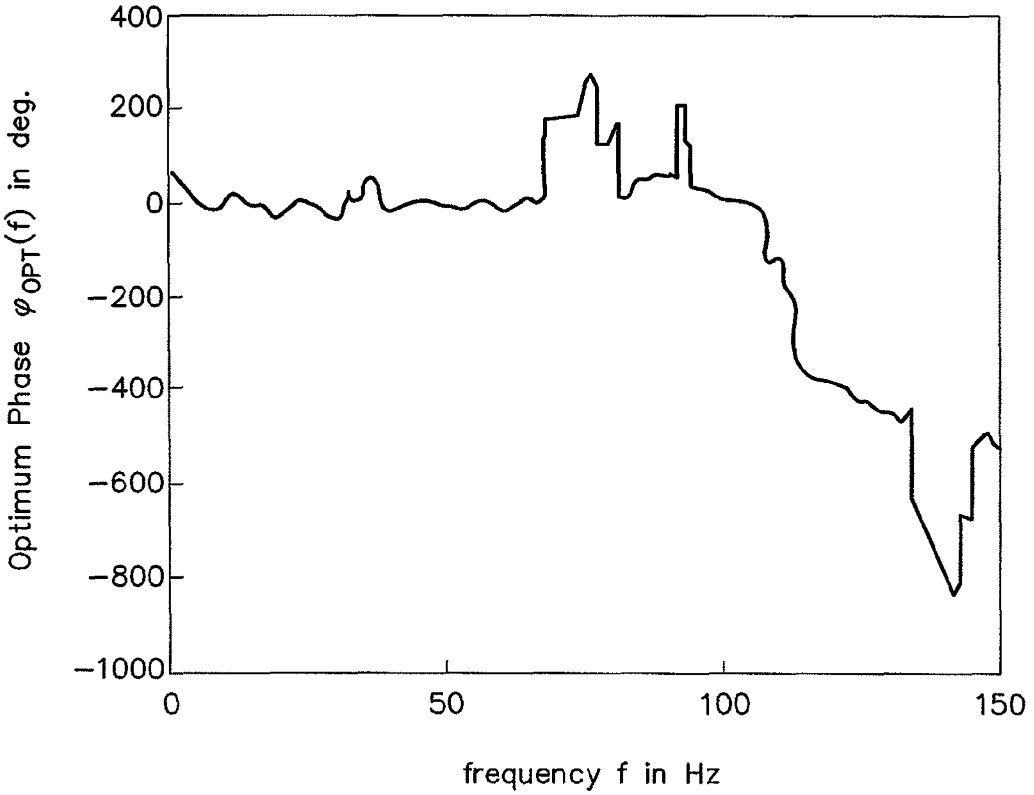
FIG. 5 illustrates a phase function of optimum phase shifts over frequency that minimizes the cost function at each frequency value.

After the necessary transfer characteristics have been determined, the desired SPL curves, for example the matrix visualized in FIG. 4, may be calculated. Thereby one transfer characteristic, for example an impulse response, is associated with one corresponding loudspeaker for each considered listening location. The sound pressure level is calculated at each listening location assuming for the calculation that an audio signal of a programmable frequency is supplied to each loudspeaker, where the audio signal supplied to the second loudspeaker is phase-shifted by a programmable phase shift relatively to the audio signal supplied to the first loudspeaker. Thereby, the phase shifts of the audio signals supplied to the other loudspeakers are initially zero or constant. In this context the term "assuming" has to be understood considering the mathematical context, i.e., the frequency, amplitude and phase of the audio signal are used as input parameters in the model calculation.

For each listening location this calculation may be split up in the following steps where the second loudspeaker has a phase-shifting element with the programmable phase shift connected upstream thereto:

Calculate amplitude and phase of the sound pressure level generated by the first and the second loudspeaker, alternatively by all loudspeakers, at the considered listening location when supplied with an audio signal of a frequency f using the corresponding transfer characteristics (e.g., impulse responses) for the calculation, whereby the second loudspeaker is assumed to be supplied with an audio signal phase shifted by a phase shift $\phi$ respectively to the audio signal supplied to the first loudspeaker; and;

Superpose with proper phase relation the above calculated sound pressure levels to obtain a total sound pressure level at the considered listening location as a function of frequency f and phase shift $\phi$.

The effect of the phase shift may be subsequently determined for each further loudspeaker. Once having calculated the SPL curves for the relevant phase and frequency values, the optimal phase shift for each considered loudspeaker may be determined as described above.

The SPL curves depicted in the diagrams of FIGS. 7A-7D have been obtained by simulation to demonstrate the effectiveness of the technique described above. FIG. 7A illustrates the sound pressure levels $SPL_{FL}$, $SPL_{FR}$, $SPL_{RL}$, $SPL_{RR}$ measured at the four listening locations before equalization, i.e., without any phase modifications applied to the audio signal. The thick black solid line represents the mean of the four SPL curves. The mean SPL has also been used as reference sound pressure level $SPL_{REF}$ for equalization. In FIG. 1, a big discrepancy between the SPL curves is observable, especially in the frequency range from 40 to 90 Hz.

Figure 7B:
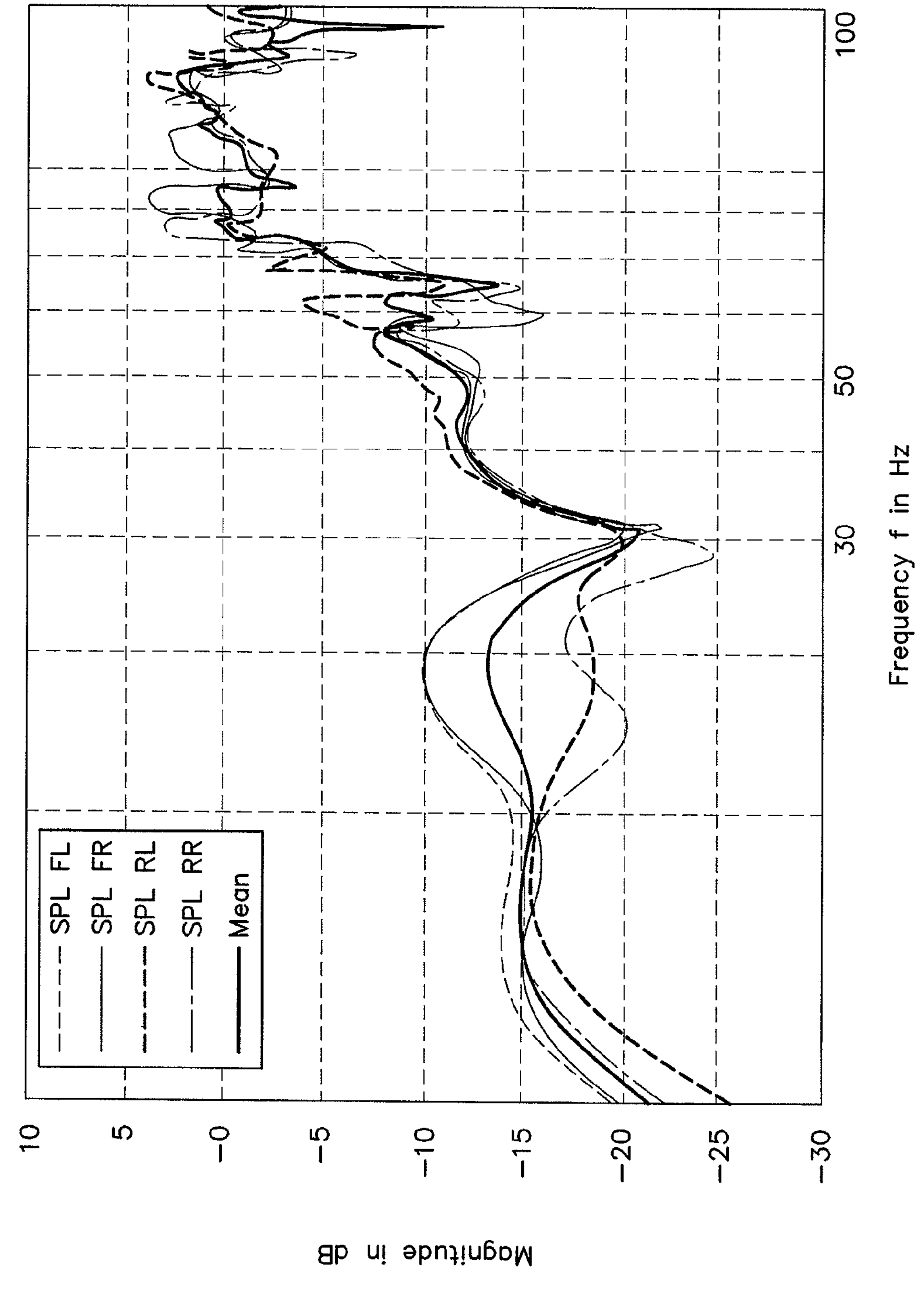

FIG. 7B illustrates the sound pressure levels $SPL_{FL}$, $SPL_{FR}$, $SPL_{L}$, $SPL_{RR}$ measured at the four listening locations after equalization using the optimal phase function $\phi_{OPT}(f)$ of FIG. 5 (without limiting the slope $\phi_{OPT}/df$). Here the SPL curves are more similar (i.e., equalized) and deviate little from the mean sound pressure level (thick black solid line).

Figure 7C:
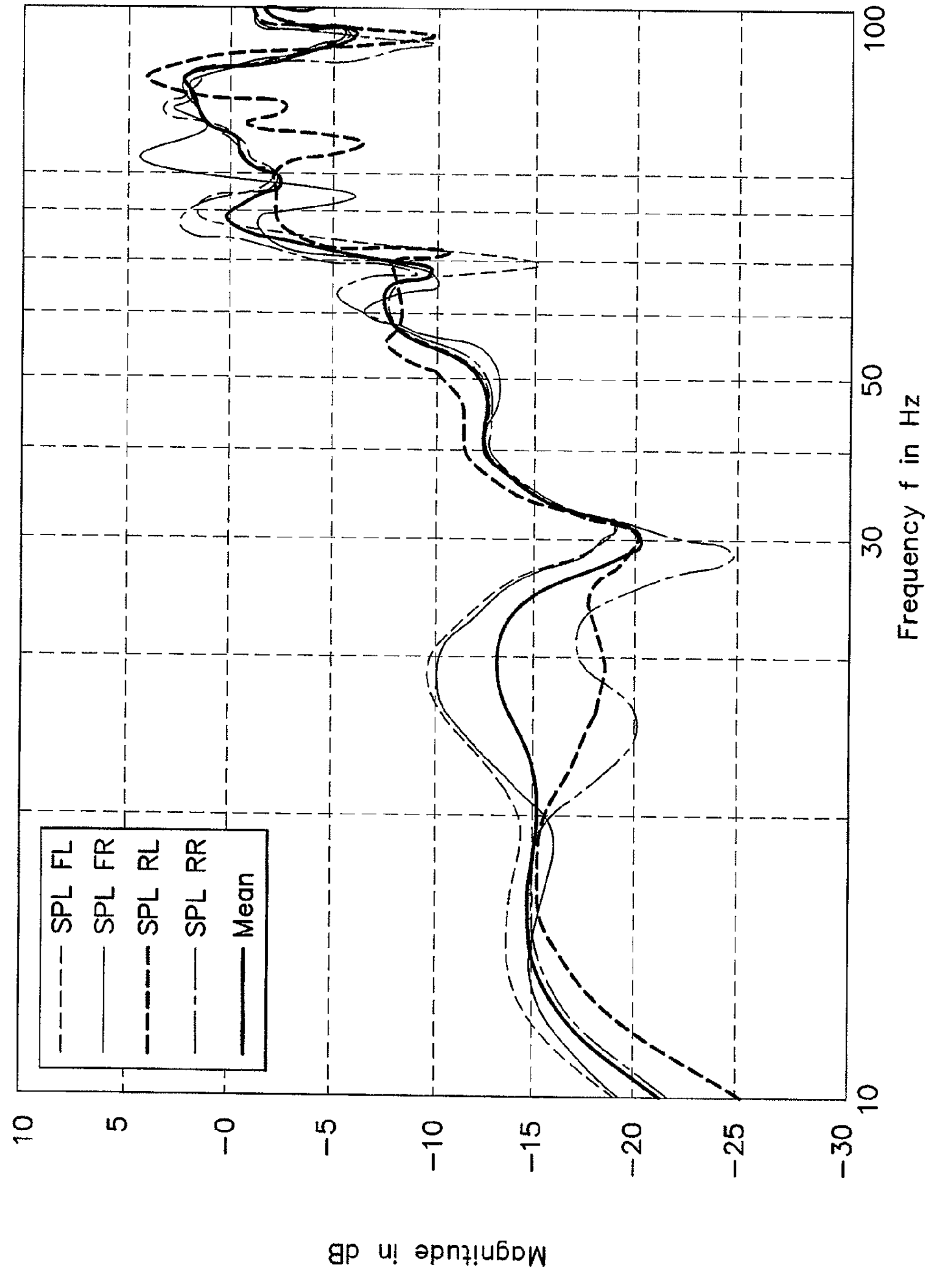
Figure 7D:
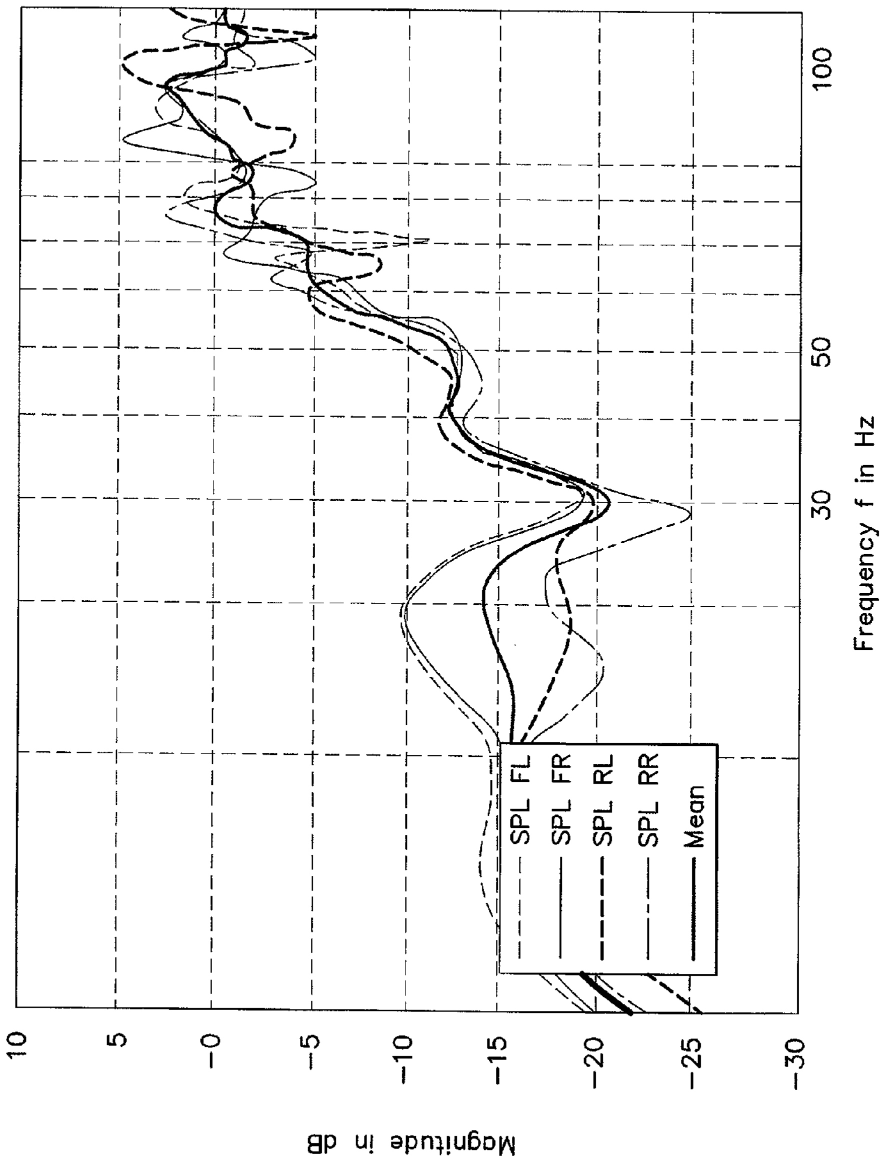

FIG. 7C illustrates the sound pressure levels $SPL_{FL}$, $SPL_{FR}$, $SPL_{RL}$, $SPL_{RR}$ measured at the four listening locations after equalization using the slope-limited phase function of FIG. 6. It is noteworthy that the equalization performs almost as good as the equalization using the phase function of FIG. 5. As a result, the limitation of the phase change to approximately 10°/Hz is regarded as a useful measure that facilitates the design of a FIR filter for approximating the phase function $\phi_{OPT}(f)$.

FIG. 7D illustrates the sound pressure levels $SPL_{FL}$, $SPL_{FR}$, $SPL_{RL}$, $SPL_{RR}$ measured at the four listening locations after equalization using a 4096 tap FIR all-pass filter for providing the necessary phase shift to the audio signal supplied to the second loudspeaker. The phase response of the FIR filter is depicted in the diagram of FIG. 6. The result is also satisfactory. The large discrepancies occurring in the unequalized system are avoided and acoustics of the room are substantially improved.

In the examples presented above, a system comprising only two loudspeakers and four listening locations of interest has been assumed. In such a system only one optimal phase function has to be determined and the corresponding FIR filter implemented in the channel supplying one of the loudspeakers (referred to as second loudspeaker in the above examples). In a system with more than two loudspeakers, an additional phase function has to be determined and a corresponding FIR all-pass filter has to be implemented in the channel supplying each additional loudspeaker. If more than four listening locations are of interest, all of them have to be considered in the respective cost function. The general procedure may be summarized as follows:

(A) Assign a number 1, 2, . . . , L to each one of L loudspeakers.

(B) Supply an audio signal of a programmable frequency f to each loudspeaker. The loudspeakers 1 to L receive the respective audio signal from a signal source which has one output channel per loudspeaker connected thereto. At least the channels supplying loudspeakers 2 to L comprising a phase shifter for modifying the phase $\phi_2$, $\phi_3$, . . . , $\phi_L$ of the respective audio signal (phase $\phi_1$ may be zero or constant).

(C) Measure the sound pressure level $SPL_1(\phi_2, f)$, $SPL_2(\phi_2, f)$, . . . $SPL_P(\phi_2, f)$ at each of the P listening location for different phase shifts $\phi_2$ of the audio signal supplied to loudspeaker 2 within a certain phase range (e.g., 0° to 360°) and for different frequencies f within a certain frequency range (e.g., 0 Hz to 150 Hz), the phase shift of the subsequent loudspeakers 3 to L thereby being fixed and initially zero or constant.

(D) Calculate the value of a cost function $CF(\phi_2, f)$ $SPL_1(\phi_2, f)$, $SPL_2(\phi_2, f)$, . . . $SPL_P(\phi_2, f)$.

(E) Search, for every frequency value f for which the cost function $CF(\phi_2, f)$ has been calculated, for the optimal phase shift $\phi_{OPT2}$ which minimizes (EQs. 2 to 4) the cost function $CF(\phi_2, f)$, thereby obtaining a phase function $\phi_{OPT2}(f)$ representing the optimal phase shift $\phi_{OPT2}$ as a function of frequency.

(F) During the further equalization process (and thereafter), operate the loudspeaker 2 with a filter disposed in the channel supplying the loudspeaker 2, i.e., the loudspeaker 2 is supplied via the filter. The filter at least approximately (FIG. 6) realizes the phase function $\phi_{OPT2}(f)$ and applies a respective frequency dependent optimal phase shift $\phi_{OPT2}(f)$ to the audio signal fed to the loudspeaker 2.

(G) Repeat steps B to F for each subsequent loudspeaker i=3, . . . , L. That is: supply an audio signal to each loudspeaker; measure the sound pressure level $SPL_1(\phi_i, f)$, $SPL_2(\phi_i, f)$, . . . $SPL_P(\phi_i, f)$; calculate the value of a cost function $CF(\phi_i, f)$; search for the optimal phase shift $\phi_{OPTi}(f)$; and henceforth operate loudspeaker i with a filter (approximately) realizing the optimal phase shift $\phi_{OPTi}(f)$.

From FIGS. 7B-D one can see that a substantial difference in sound pressure levels may not be equalized in a frequency range from about 20 to 30 Hz. This is due to the fact that only one loudspeaker (e.g., the subwoofer) of the sound system under test is able to reproduce sound with frequencies below 30 Hz. Consequently, in this frequency range the other loudspeakers were not able to radiate sound and therefore may not be used for equalizing. If a second subwoofer is employed, then this gap in the SPL curves may be "closed".

After equalizing all the loudspeakers as explained above, an additional frequency-dependent gain may be applied to all the channels in order to achieve a desired magnitude response of the sound pressure levels at the listening locations of interest. This frequency-dependent gain is the same for all channels.

The above-described examples relate to techniques for equalizing sound pressure levels in at least two listening locations. Thereby a "balancing" of sound pressure is achieved. However, the technique may also be usefully employed when maximizing sound pressure at the listening locations and/or adjusting actual sound pressure curves (SPL over frequency) to match a "target function", which may be applied to a single listening location. In this case the cost function has to be chosen accordingly. In contrast, when balancing sound pressure, at least two listening locations have to be considered.

When maximizing the sound pressure level, the cost function is dependent from the sound pressure level at the considered listening location. In this case the cost function has to be maximized in order to maximize the sound pressure level at the considered listening location(s). Thus, the SPL output of an audio system may be improved in the bass frequency range without increasing the electrical power output of the respective audio amplifiers.

Figure 8:
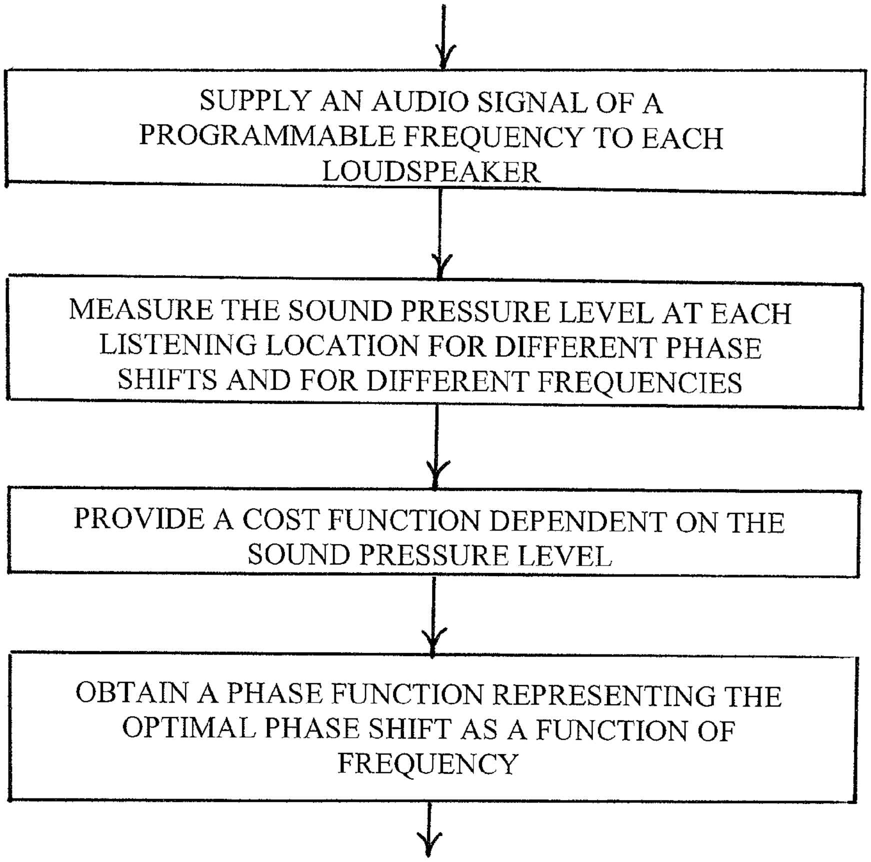
FIG. 8 is a flow chart illustration of processing to automatically equalize the sound pressure according to an aspect of the invention.

FIG. 8 is a flow chart illustration of processing to automatically equalize the sound pressure according to an aspect of the invention.

Although various examples have been disclosed, it will be apparent to those skilled in the art that various changes and modifications can be made which will achieve some of the advantages of the invention without departing from the spirit and scope of the invention. It will be obvious to those reasonably skilled in the art that other components performing the same functions may be suitably substituted. Such modifications are intended to be covered by the claims. Furthermore the scope of the invention is not limited to automotive applications but may also be applied in any other environment, e.g. in consumer applications like home cinema or the like and also in cinema and concert halls or the like.

What is claimed is:

1. A method for an automatic equalization of sound pressure levels in at least one listening location, the sound pressure level being generated by a first loudspeaker and second loudspeaker, the method comprising:

determining a transfer characteristic of each combination the loudspeakers and listening location;

calculating a sound pressure level at each listening location assuming that an audio signal of a programmable frequency is supplied to each loudspeaker, where the audio signal supplied to the second loudspeaker is phase-shifted by a programmable phase shift relative to the audio signal supplied to the first loudspeaker, and where the phase shift of the audio signal supplied to the other loudspeakers is initially zero or constant;

providing a cost function dependent on the sound pressure level; and obtaining a phase function representing an optimal phase shift as a function of frequency by searching a frequency dependent optimal phase shift that yields an extremum of the cost function.

2. The method of claim 1, where the step of obtaining further comprises:

evaluating the cost function for pairs of phase shift and frequency;

searching, for each frequency for which the cost function has been evaluated, for an optimal phase shift that yields an extremum of the cost function.

3. The method of claim 1, where the cost function depends on the sound pressure level, and in the step of obtaining, an optimal phase shift is determined that maximizes the cost function yielding a maximal sound pressure level.

4. The method of claim 1, where the cost function is dependent on the sound pressure level and a reference sound pressure level, and in the step of obtaining, an optimal phase shift is determined that minimizes the cost function, the cost function representing the distance between the sound pressure level at the at least one listening location and the reference sound pressure level.

5. The method of claim 4, where the reference sound pressure level is a predefined target function of a desired sound pressure level over frequency.

6. The method of claim 4, where the sound pressure levels are calculated for at least two listening locations, and the reference sound pressure level is one of the sound pressure level calculated for the first listening location and the mean value of the sound pressure levels calculated for at least two listening locations.

7. The method of claim 6, where the cost function is calculated as the sum of the absolute differences of each calculated sound pressure level and the reference sound pressure level for each phase value and each frequency.

8. The method of claim 4, where the cost function is weighted with a frequency dependent factor inversely proportional to the mean sound pressure level.

9. The method of claim 1, further comprising:

applying a respective frequency dependent optimal phase shift to the audio signal fed to the second loudspeaker by performing additional calculations assuming that the second loudspeaker has an upstream filter, where the filter approximately realizes the phase function.

10. The method of claim 9, where at least one further loudspeaker is provided, the method comprising:

calculating a sound pressure level at each listening location assuming that an audio signal of a programmable frequency is supplied to each loudspeaker, where the audio signal supplied to the additional loudspeaker is phase-shifted by a programmable phase shift relative to the audio signal supplied to the first loudspeaker;

updating the cost function;

obtaining an additional phase function representing the optimal phase shift as a function of frequency by searching an optimal phase shift that minimizes the cost function; and applying a respective frequency dependent optimal phase shift to the audio signal fed to the additional loudspeaker by performing additional calculations assuming that the additional loudspeaker has an additional upstream filter.

11. The method of claim 1, further comprising:

calculating filter coefficients of an all-pass filter such that the phase-response of the all-pass filter approximates the phase function; and applying a respective frequency dependent optimal phase shift to the audio signal fed to the second loudspeaker by performing additional calculations assuming that the second loudspeaker has an upstream all-pass filter.

12. The method of claim 1, where the step of calculating the sound pressure level is performed for each integer frequency value within a given frequency range.

13. The method of claim 1, where the step of obtaining an optimal phase shift comprises a minimum search with a constraint that the slope of the obtained obtaining phase function does not exceed a given limit.

14. A method for automatically equalizing sound pressure levels, comprising:

supplying an audio signal having a programmable frequency to a first loudspeaker and second loudspeaker, where the audio signal supplied to the second loudspeaker is phase-shifted by a programmable phase shift relative to the audio signal supplied to the first loudspeaker and, and where the phase shift of the audio signal supplied to the first loudspeaker is initially constant;

measuring a sound pressure level at a listening location for different phase shifts and for different frequencies;

applying a cost function dependent on the sound pressure level; and obtaining a phase function representing an optimal phase shift as a function of the frequency by searching a frequency dependent optimal phase shift that yields an extremum of the cost function.

15. A method for an automatic equalization of sound pressure levels in at least one listening location, the sound pressure level being generated by at least a first loudspeaker and a second loudspeaker, the method comprising:

supplying an audio signal of a programmable frequency to each loudspeaker, where the audio signal supplied to the second loudspeaker is phase-shifted by a programmable phase shift relative to the audio signal supplied to the first loudspeaker, and where the phase shift of the audio signal supplied to the other loudspeakers is initially zero or constant;

measuring a sound pressure level at each listening location for different phase shifts and for different frequencies;

providing a cost function dependent on the sound pressure level; and obtaining a phase function representing an optimal phase shift as a function of frequency by searching a frequency dependent optimal phase shift that yields an extremum of the cost function.

16. The method of claim 15, where the step of obtaining further comprises:

evaluating the cost function for pairs of phase shifts and frequencies; and searching for each frequency for which the cost function has been evaluated, for an optimal phase shift that yields an extremum of the cost function.

17. The method of claim 15, where the cost function is dependent on the sound pressure level, and in the searching step, an optimal phase shift is determined that maximizes the cost function yielding a maximal sound pressure level.

18. The method of claim 15, where the cost function depends on the sound pressure level and a reference sound pressure level, and in the step of obtaining, an optimal phase shift is determined that minimizes the cost function, the cost function representing the distance between the sound pressure level at the at least one listening location and the reference sound pressure level.

19. The method of claim 18, where the reference sound pressure level is a predefined target function of desired sound pressure level over frequency.

20. The method of claim 18, where the sound pressure levels are measured in at least two listening locations, and the reference sound pressure level is one of the sound pressure level measured at the first listening location and the mean value of the sound pressure levels measured at each listening location.

21. The method of claim 20, where the cost function is calculated as the sum of the absolute differences of each measured sound pressure level and the reference sound pressure level for each phase value and each frequency.

22. The method of claim 18, where the cost function is weighted with a frequency dependent factor inversely proportional to the mean sound pressure level.

23. The method of claim 15, further comprising:

applying the respective frequency dependent optimal phase shift to the audio signal fed to the second loudspeaker by operating the second loudspeaker through an upstream filter, where the filter approximately establishes the phase function.

24. The method of claim 23, where at least one additional loudspeaker is provided for generating the sound pressure level in the at least one listening location, the method comprising:

supplying the audio signal of a programmable frequency to each loudspeaker, where the audio signal supplied to the additional loudspeaker is phase-shifted by a programmable phase shift relative to the audio signal supplied to the first loudspeaker;

measuring the sound pressure level at each listening location for different phase shifts and for different frequencies;

updating the cost function;

obtaining an additional phase function representing the optimal phase shift as a function of frequency by searching a frequency dependent optimal phase shift that minimizes the cost function; and applying a respective frequency dependent optimal phase shift to the audio signal fed to the additional loudspeaker by operating the additional loudspeaker through an additional upstream filter, where the filter approximately realizes an additional phase function.

25. The method of claim 15, further comprising:

calculating filter coefficients of an all-pass filter such that the phase-response of the all-pass filter approximates the phase function; and applying a respective frequency dependent optimal phase shift to the audio signal fed to the second loudspeaker by operating the second loudspeaker through an all-pass filter.

26. The method of claim 15, where the step of measuring the sound pressure level is performed for each integer frequency value within a given frequency range.

27. The method of claim 15, where the step of obtaining is performed with a constraint that the slope of the obtained phase function does not exceed a given limit.

28. The method of claim 15, further comprising:

operating all loudspeakers through an upstream gain-filter that applies an equal frequency dependent gain on the audio signals supplied to each loudspeaker without distorting the phase-relations between the audio signals supplied to each loudspeaker.

* * * * *